United States Patent
Puri et al.

(10) Patent No.: US 9,572,037 B2
(45) Date of Patent: Feb. 14, 2017

(54) METHOD AND SYSTEM FOR DEFENDING A MOBILE NETWORK FROM A FRAUD

(71) Applicant: Yaana Technologies, LLC, Milpitas, CA (US)

(72) Inventors: Rajesh Puri, Fremont, CA (US); Michael P. Hammer, Reston, VA (US); David Grottwassink, Safety Harbor, FL (US)

(*) Notice: Subject to any disclaimer, the term of this patent is extended or adjusted under 35 U.S.C. 154(b) by 0 days.

(21) Appl. No.: 14/659,016

(22) Filed: Mar. 16, 2015

(65) Prior Publication Data
US 2016/0277934 A1    Sep. 22, 2016

(51) Int. Cl.
H04M 1/66 (2006.01)
H04W 12/12 (2009.01)
H04W 12/06 (2009.01)
H04W 8/02 (2009.01)

(52) U.S. Cl.
CPC ............... *H04W 12/12* (2013.01); *H04W 8/02* (2013.01); *H04W 12/06* (2013.01)

(58) Field of Classification Search
CPC ............... H04L 29/06027; H04L 63/08; H04L 63/0892; H04W 12/06; H04W 4/08; H04W 80/04; H04W 84/045
USPC .......................................................... 455/410
See application file for complete search history.

(56) References Cited

U.S. PATENT DOCUMENTS 6,266,704 B1   7/2001  Reed et al.
6,377,688 B1   4/2002  Numao
7,536,464 B1   5/2009  Dommety et al.
7,634,522 B1  12/2009  Cartier et al.
7,809,943 B2  10/2010  Seidel
(Continued)

FOREIGN PATENT DOCUMENTS

EP  1587249 A1  10/2005
EP  1837815 A1   9/2007
(Continued)

OTHER PUBLICATIONS

International Search Report issued Jun. 22, 2015 in copending PCT Application No. PCT/US2015/020755 filed Jun. 16, 2015, inventors Puri, Rajesh, et al.
(Continued)

*Primary Examiner* — Don N Vo
(74) *Attorney, Agent, or Firm* — Steptoe & Johnson LLP (57) ABSTRACT

A system and method for defending a mobile network from a fraud committed via GTP is disclosed. According to one embodiment, a computer-implemented method includes receiving receives information associated with a GTP request from a serving node to a gateway node in a mobile network. The information associated with the GTP request is a GTP control plane request or a CDR associated with the GTP request. The information associated with a GTP request is examined, and parameters contained in the information associated with the GTP request are analyzed. It is determined that the GTP request is a fraudulent GTP request if the parameters do not belong to an authorized subscriber of the mobile network. A GTP tunnel associated with the fraudulent GTP request is denied, an established fraudulent GTP tunnel is deleted, or network traffic established by a fraudulent GTP tunnel is redirected to a monitoring node.

20 Claims, 5 Drawing Sheets

(56) References Cited

U.S. PATENT DOCUMENTS

| | | |
|---|---|---|
| 7,961,663 B2 | 6/2011 | Lin |
| 2003/0070070 A1 | 4/2003 | Yeager et al. |
| 2003/0081607 A1 | 5/2003 | Kavanagh |
| 2003/0133443 A1 | 7/2003 | Klinker et al. |
| 2003/0147536 A1 | 8/2003 | Andivahis et al. |
| 2004/0064688 A1 | 4/2004 | Jacobs |
| 2004/0067761 A1 | 4/2004 | Pyhalammi et al. |
| 2004/0196978 A1 | 10/2004 | Godfrey et al. |
| 2004/0213179 A1 | 10/2004 | Lundin et al. |
| 2004/0264405 A1 | 12/2004 | MacGregor Scobbie |
| 2005/0259637 A1 | 11/2005 | Chu et al. |
| 2006/0059091 A1 | 3/2006 | Wang et al. |
| 2006/0204007 A1 | 9/2006 | Doetzkies et al. |
| 2006/0224883 A1 | 10/2006 | Khosravi et al. |
| 2007/0006296 A1 | 1/2007 | Nakhjiri et al. |
| 2007/0100981 A1 | 5/2007 | Adamczyk et al. |
| 2007/0156632 A1 | 7/2007 | Wolff et al. |
| 2008/0101345 A1 | 5/2008 | Suzuki |
| 2008/0107096 A1 | 5/2008 | Huang |
| 2008/0212782 A1 | 9/2008 | Brettle et al. |
| 2008/0279381 A1 | 11/2008 | Narendra et al. |
| 2008/0285452 A1 | 11/2008 | Oran |
| 2009/0088147 A1 | 4/2009 | Bu et al. |
| 2009/0259532 A1 | 10/2009 | Bergstraesser et al. |
| 2009/0287922 A1 | 11/2009 | Herwono et al. |
| 2009/0305688 A1* | 12/2009 | Bonnet ............... H04L 12/1822 455/422.1 |
| 2010/0039993 A1 | 2/2010 | Ramankutty et al. |
| 2010/0086119 A1 | 4/2010 | De Luca et al. |
| 2010/0246500 A1 | 9/2010 | Rydnell et al. |
| 2011/0040706 A1 | 2/2011 | Sen et al. |
| 2011/0040858 A1 | 2/2011 | Gum |
| 2011/0069663 A1 | 3/2011 | Shu et al. |
| 2011/0075675 A1 | 3/2011 | Koodli et al. |
| 2011/0216646 A1 | 9/2011 | Flinta et al. |
| 2011/0219123 A1 | 9/2011 | Yang et al. |
| 2012/0120788 A1* | 5/2012 | Hu ..................... H04L 12/4633 370/216 |
| 2012/0191860 A1 | 7/2012 | Traversat et al. |
| 2012/0314854 A1 | 12/2012 | Waters |
| 2012/0331298 A1 | 12/2012 | Xu et al. |
| 2013/0084896 A1 | 4/2013 | Barkie et al. |
| 2013/0091526 A1 | 4/2013 | Iyer et al. |
| 2013/0137399 A1* | 5/2013 | Bari ...................... G06Q 30/04 455/411 |
| 2013/0159715 A1 | 6/2013 | Klassen et al. |
| 2013/0160097 A1 | 6/2013 | Dowlatkhah |
| 2013/0254853 A1 | 9/2013 | Chaturvedi et al. |
| 2013/0283060 A1 | 10/2013 | Kulkarni et al. |
| 2013/0301627 A1 | 11/2013 | Chen et al. |
| 2014/0040975 A1 | 2/2014 | Raleigh et al. |
| 2014/0129728 A1 | 5/2014 | Alex |
| 2014/0241169 A1 | 8/2014 | Collins |
| 2014/0355520 A1 | 12/2014 | Wallis |
| 2015/0065125 A1 | 3/2015 | Patel et al. |

FOREIGN PATENT DOCUMENTS

| | | |
|---|---|---|
| EP | 1993257 A1 | 11/2008 |
| WO | 2014/018425 A2 | 1/2014 |

OTHER PUBLICATIONS

PCT International Search Report issued Jan. 8, 2015 in corresponding PCT Application No. PCT/US2015/016961 filed Feb. 20, 2015, invententor(s) Grootwassink, David, et al.

PCT International Search Report issued Jan. 28, 2016 in corresponding PCT Application No. PCT/US2015/061976 filed Nov. 20, 2015, inventors Rajesh Puri, et al.

PCT International Search Report issued Feb. 2, 2016 in corresponding PCT Application No. PCT/US2015/054957 filed Oct. 9, 2015, inventors Michael P. Hammer, et al.

PCT International Search Report issued Jul. 29, 2016 in corresponding PCT Application No. PCT/US16/30311 filed Apr. 29, 2016, inventors Michael P. Hammer, et al.

* cited by examiner

METHOD AND SYSTEM FOR DEFENDING A MOBILE NETWORK FROM A FRAUD

FIELD

The present disclosure generally relates to mobile networks and, more particularly, to a method and system for defending a mobile network from a fraud committed via general packet radio service (GPRS) tunneling protocol (GTP).

BACKGROUND

A modern mobile cellular telephony/data network includes several cooperating nodes and/or gateways to authenticate a user device's attachment to the network, authorize services, and establish data and voice paths for the user device through the network to other mobile users, other mobile networks, and the Internet. In a third-generation (3G) network, a data path for a user device is provided by specialized routers, such as serving GPRS support nodes (SGSNs) for the radio edge and gateway GPRS support nodes (GGSNs) for the Internet edge. In a fourth-generation (4G) network (e.g., evolved packet system (EPS), long-term evolution (LTE)), serving gateways (SGWs) (for radio edge) and packet data network gateways (PGWs) (for Internet and international mobile subscriber (IMS) voice core edge) provide a similar voice and data path through a visited (roaming) network and a home network for a user device.

The authentication and subscription information of a subscriber is maintained by a home location register (HLR) for a 3G network or a home subscriber server (HSS) for a 4G network. Alternate network paths (e.g., signaling system no. 7 (SS7) for 3G, diameter signaling for 4G) may be provided to the user device using the authentication and subscription information of the subscriber obtained from the HLR or the HSS.

A GTP tunnel is established between a serving node (e.g., SGSN, SGW) and a gateway node (e.g., GGSN, PGW) to allow a user device to move from one location to another location within a home network while continuing to connect to an external packet switched network such as the Internet. The GTP is divided into two separate planes, GTP-U and GTP-C. GTP-U is used to carry user-data traffic, i.e., the network traffic generated from a user device when accessing the Internet (e.g., email, web surfing, gaming). GTP-C is used to carry signals within a GPRS-based core network for signaling between GGSN and SGSN. When a user device is connected or disconnected to a mobile network, or hops inside the mobile network, the SGSN or SGW detects the move of the user device and sends appropriate connect/disconnect signals to the GGSN or PGW that serves the user device. The GGSN or PGW provides a public IP address for the user device in response to requests from the user device through various SGSN or SGWs that connect the user device. GTP-C messages may further include a phone number, a cell that the user device is connected to (or the user device's physical location), the access point name (APNs), and the manufacture and model of the user device. GTP-C messages are used to negotiate the IDs of the GTP tunnel that carries the user traffic.

Security holes exist in a GTP because the GTP tunnel established between the serving node and the gateway node has no authentication or authorization facilities. In a 3G network, a GGSN receives connection requests from a user device and accepts all Create Session Request messages regardless of international mobile subscriber identity (IMSI) of the user device. A GTP tunnel is established to a requesting subscriber based on the Create Session Request messages. Attackers may exploit these GTP security holes.

SUMMARY

A system and method for defending a mobile network from a fraud committed via GTP is disclosed. According to one embodiment, a computer-implemented method includes receiving receives information associated with a GTP request from a serving node to a gateway node in a mobile network. The information associated with the GTP request is a GTP control plane request or a CDR associated with the GTP request. The information associated with a GTP request is examined, and parameters contained in the information associated with the GTP request are analyzed. It is determined that the GTP request is a fraudulent GTP request if the parameters do not belong to an authorized subscriber of the mobile network. A GTP tunnel associated with the fraudulent GTP request is denied, an established fraudulent GTP tunnel is deleted, or network traffic established by a fraudulent GTP tunnel is redirected to a monitoring node.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein.

The figures do not describe every aspect of the teachings described herein and do not limit the scope of the claims.

DETAILED DESCRIPTION

A system and method for defending a mobile network from a fraud committed via GTP is disclosed. According to one embodiment, a computer-implemented method includes receiving receives information associated with a GTP request from a serving node to a gateway node in a mobile network. The information associated with the GTP request is a GTP control plane request or a CDR associated with the GTP request. The information associated with a GTP request is examined, and parameters contained in the information associated with the GTP request are analyzed. It is determined that the GTP request is a fraudulent GTP request if the parameters do not belong to an authorized subscriber of the mobile network. A GTP tunnel associated with the fraudulent GTP request is denied, an established fraudulent GTP tunnel is deleted, or network traffic established by a fraudulent GTP tunnel is redirected to a monitoring node.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

Figure 1:
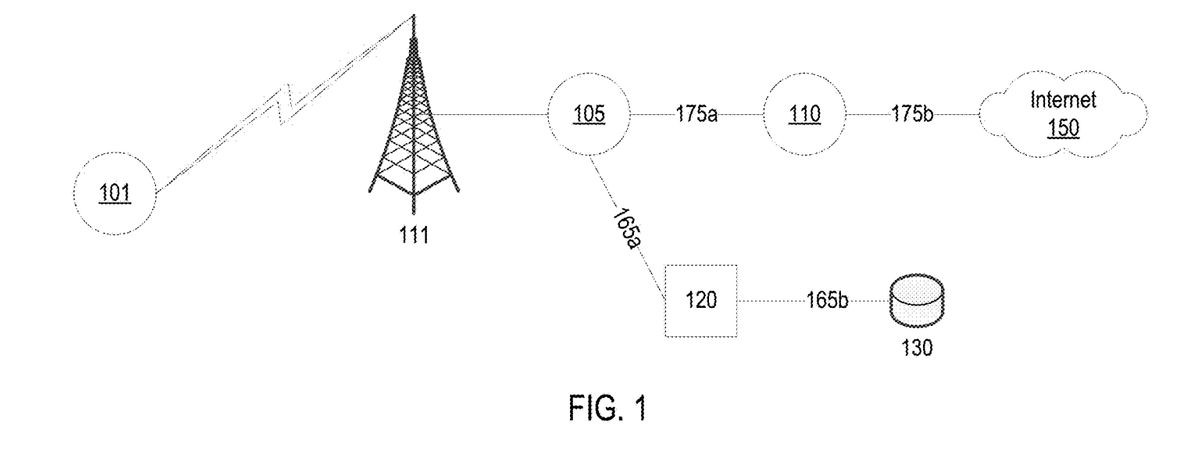
FIG. 1 illustrates a standard architecture of a mobile network, according to one embodiment.

FIG. 1 illustrates a standard architecture of a mobile network, according to one embodiment. The user equipment (UE) 101 may be a mobile phone, a handset, a tablet computer, a wireless device, or the like. The radio access network (RAN) 111 connects the UE 101 to a core network (CN) including the SGSN 105 and GGSN 110. Depending on the standard, the UE 101 may also be referred to as terminal equipment or a mobile station (MS).

A subscriber of the UE 101 sends an access request to a radio access network 111 and gains access to the radio access network 111 for receiving services. Initially, the radio access network 111 assigns a radio traffic channel to the UE 101 following standard radio control procedures. In one embodiment, the radio network 111 is a universal terrestrial radio access network (UTRAN). After the radio traffic channel is assigned to the UE 101, the radio access network 111 connects the radio link to the SGSN node 105. The SGSN node 105 signals to the HLR (or HSS) 130 via an SS7 path 165a-165b through a signal transfer point (STP) 120 and updates the HLR 130 with a new location of the UE 101. The HLR 130 returns to the SGSN 105 via the SS7 path 165a-165b with authentication parameters and subscription information of the UE 101, including a list of allowable access point names (APNs) to the UE 101. Once the subscription information of UE 101 is confirmed by the HLR 103, the UE 101 is authenticated and authorized to attach to the radio access network 111. The authentication and authorization process may involve the Radio Network Controller (RNC), a Mobile Switch Center (MSC), or a Mobility Management Entity (MME) that compares a response by the UE 101 with the correct response provided by the HLR 103.

After the UE 101 is authenticated and authorized, the SGSN (or SGW), on behalf of the UE 101, makes a request to establish a packet data protocol (PDP) session to the GGSN (or PGW) 110. If the APN of the GGSN 110 is listed in the allowed list of APNs received from the HLR 130, the SGSN 105 establishes a GTP tunnel 175a to the GGSN 110. After the GTP tunnel 175a is established, the UE 101 can connect to the Internet 150 via the GTP tunnel 175a and the path 175b between the GGSN 110 and the Internet 150.

Figure 2:
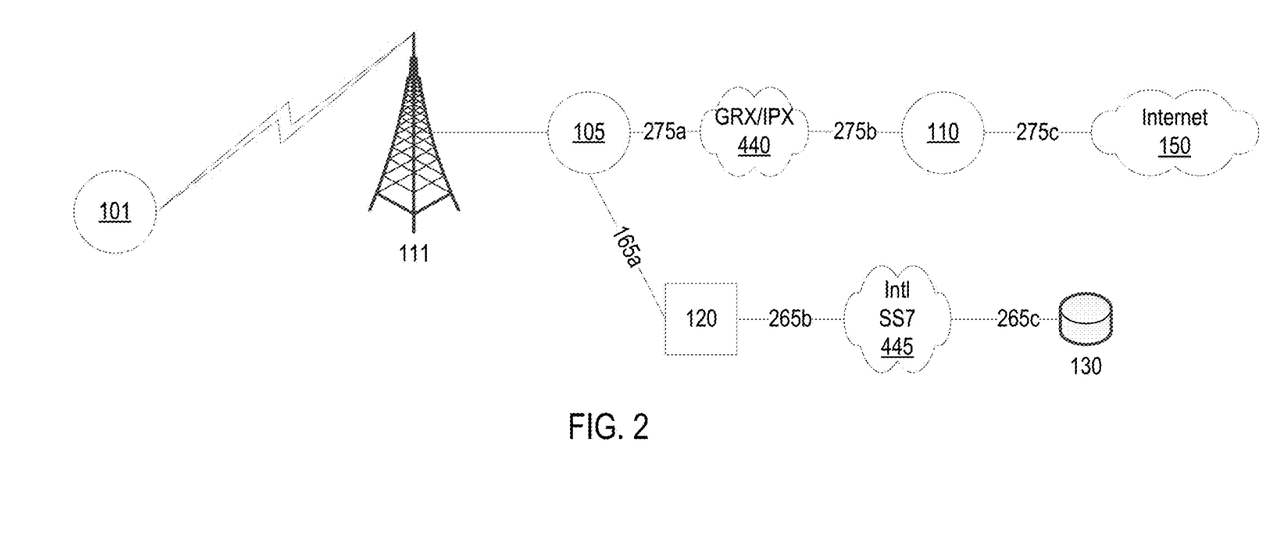
FIG. 2 illustrates a roaming architecture of a mobile network, according to one embodiment.

FIG. 2 illustrates a roaming architecture of a mobile network, according to one embodiment. The roaming architecture includes a GPRS roaming exchange (GRX) and/or IP exchange (IPX) 440 established on the path 275a-275b between the SGSN 105 and the GGSN 110. The GRX/IPX 440 routes IP-based roaming traffic between visited networks and home networks or other types of service providers (e.g., Internet service provider (ISP)). The SS7 path 265b-265c between the STP 120 and the HLR 130 may be established over the international SS7 network 445.

Security holes may exist because the GTP established between the SGSN 105 and GGSN 110 has no authentication or authorization facilities. The GGSN 110 receives connection requests from SGSN 105 for subscribers (e.g., UE 101) and accepts all Create Session Request messages regardless of international mobile subscriber identity (IMSI) of the UE 101. A home subscriber is authenticated to the home network through the SS7 path 265b-265c; however, the home subscriber may submit the requests through a SGSN to a GGSN that does not belong to the visited network or the home network. For example, the GGSN that receives the request from the GRX/IPX 440 via 275b may belong to an attacked network, and the attacked GGSN may provide the IP address for the UE 101. A GTP tunnel is established to the requesting subscribers based on the Create Session Request messages. Therefore, the resulting connection of the subscribers onto the Internet 150 uses a source IP address of the attacked operator.

Figure 3:
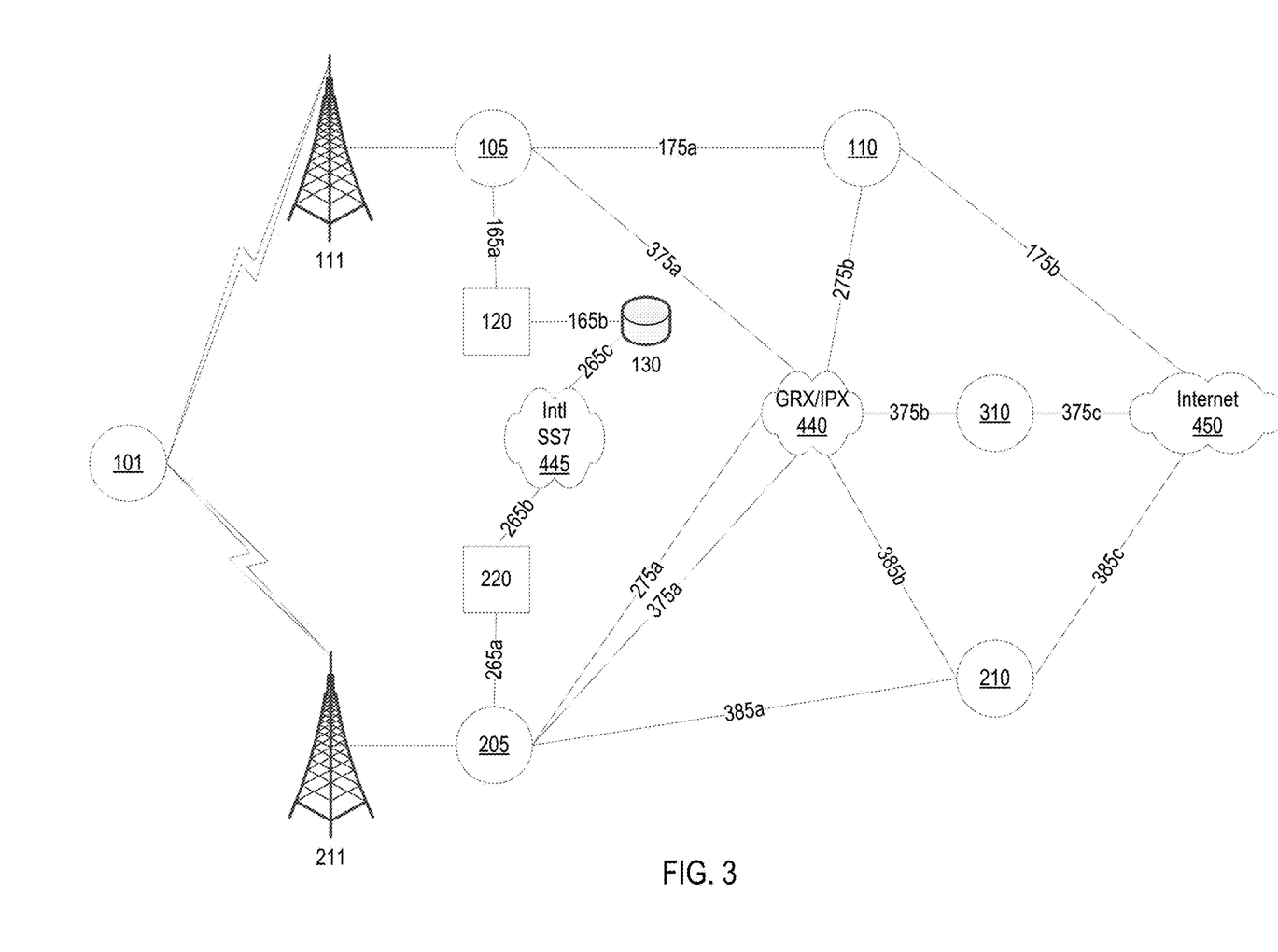
FIG. 3 illustrates a combined architecture of an exemplary mobile networks including home, visited, and attacked networks, according to one embodiment.

FIG. 3 illustrates a combined architecture of an exemplary mobile networks including home, visited, and attacked networks. The combined architecture shows components and vectors of a home network, a visited network, an attacked network, and neutral networks. The network nodes and communication paths designated in 100's (e.g., SGSN 105, GGSN 110, STP 120, and HLR 130) belong to the home network. Similarly, the network nodes and communication paths designated in 200's (e.g., SGSN 205, GGSN 210, and STP 220) belong to the visited network, and the network nodes and communication paths designated in 300's (e.g., GGSN 310) belong to the attacked network. The GRX/IPX 440, Internet 450 and the international SS7 network 445 belong to the neutral networks.

The path 175a-175b between the SGSN 105 and the GGSN 110, and the GGSN 110 and the Internet 450 is a normal path within the home network as shown in FIG. 1. The path 275a-275b between the SGSN 205 and the GRX/IPX 440, and the GRX/IPX 440 and the GGSN 110 is a normal path from the visited network as shown in FIG. 2. The path 375a-375b-375c from the SGSN 205 to the Internet 450 via the GRX/IPX 440 and the GGSN 310 indicates an attack vector that can originate from either the home network or the visited network. The path 375a-385b-385c from the SGSN 205 to the Internet 450 via the GRX/IPX 440 and the GGSN 210 indicates another attack vector that can originate from the home network on the visited network. The path 385a-385c from the SGSN 205 to the Internet 450 via the GGSN 210 indicates another attack vector that can originate from the visited network on the visited network if it is not authorized as a Local Break Out (LBO), where the home network allows the user to reach the Internet via the visited network.

An attacker may exploit these security holes with the cooperation of someone or a node that has access to HLR 130 and/or the operation and support system (OSS) of the attacked network, or access to an SS7 network (e.g., 165a-165b of FIG. 1, 265b-265c of FIG. 2) with an ability to generate an SS7/GSM mobile application part (MAP) message. Two types of GTP fraudulent tunnel requests can be made by the attacker.

The first type of fraud exploits a victim APN inserted at the HLR 130. The HLR 130 is updated to add victim GGSN/APN to the attacker's list of allowed APNs. The attacker can attach normally to the network, initiate a PDP session to the victim GGSN, and can roam the Internet 450 as effectively cloaked.

The second type of fraud exploits a victim APN inserted in the SS7 network. The attacker can attach normally to the network and invokes an SS7/GSM MAP message "InsertSubscriberData" toward the current SGSN. The victim APN is added to the list of allowed APNs. The attacker initiates a PDP session to the victim GGSN, and can roam the Internet effectively cloaked.

The present disclosure relates to discovering third generation partnership project (3GPP) GTP fraudulent tunnel requests and providing both passive and active responses to GTP fraudulent attacks. The following examples describe mobile network system architecture and a method for providing a fraud defense against a GTP security hole. Although the below examples are directed to 3G networks, it is apparent that the present disclosure can be applied to other generation/types of network including 4G or any other generation networks without deviating from the scope of the present disclosure. For example, the SGSN 105 and the GGSN 110 may be replaced with an S-GW and a P-GW of a 4G network.

Figure 4:
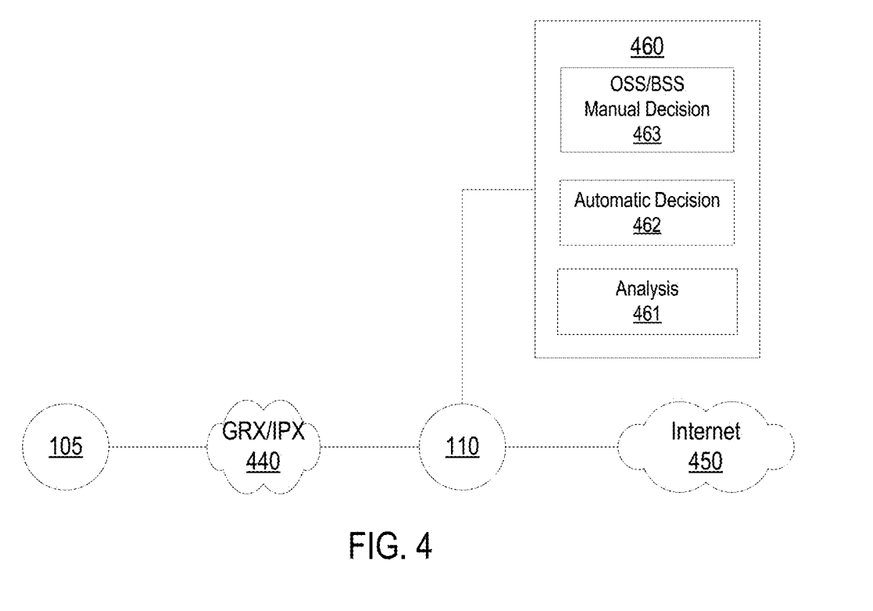
FIG. 4 illustrates a schematic diagram of an exemplary mobile network protected from attack, according to a first embodiment.

FIG. 4 illustrates a schematic diagram of an exemplary mobile network protected from attack, according to a first embodiment. A GTP tunnel is established between the SGSN 105 and the GGSN 110 via GRX/IPX 440. The GGSN 110 generates call detail records (CDR) and normally sends those to an OSS/BSS system. The GGSN 110 also sends those CDRs to a monitoring node 460, and the analysis function 461 of the monitoring node 460 examines IMSI parameters looking for identities that do not belong to a subscriber of the home network operator. Any GTP tunnels that are not associated with IMSIs of the home operator are considered a fraudulent GTP tunnel. However, the CDR examination can identify a GTP fraud after the fraudulent attack starts and a GTP tunnel is established. In one embodiment, the automatic decision function 462 sends a Delete Session Request message to the GGSN 110 to take action to delete the PDP session, thus tearing down the established fraudulent GTP tunnel. In another embodiment, the automatic decision function 462 alerts the OSS/BSS of the fraudulent GTP tunnel. Operations personnel staffing the OSS/BSS may then manually instruct the GGSN 110 to tear down the GTP tunnel via the OSS/BSS manual decision function 463. In yet another embodiment, the automated functions (e.g., analysis function 461, automatic decision 462, and OSS/BSS manual decision 463) may reside within the GGSN 110 to detect a fraudulent GTP tunnel when the CDR is created.

Figure 5:
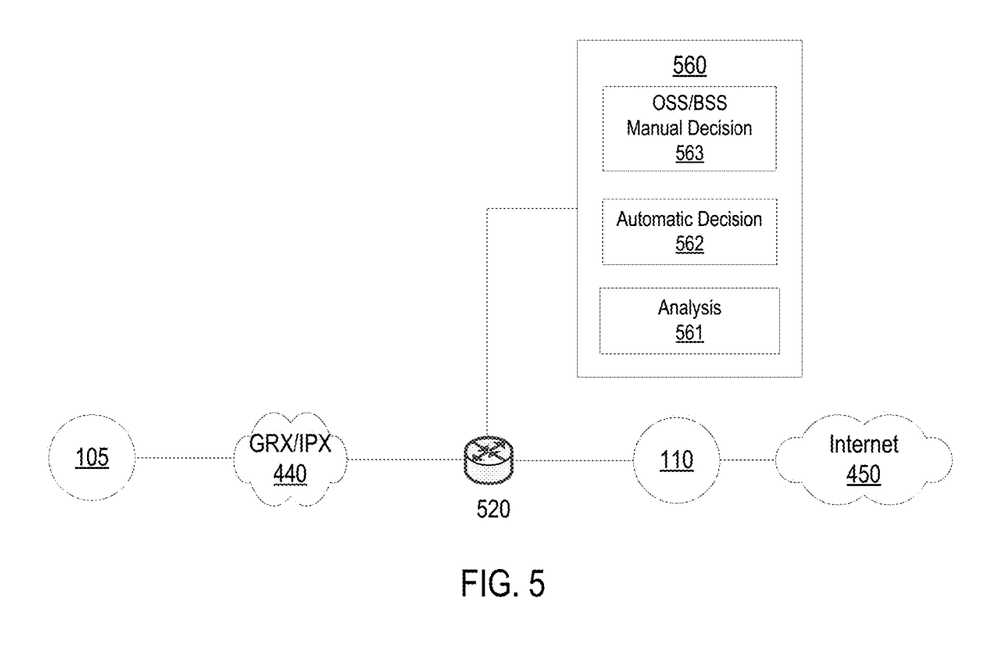
FIG. 5 illustrates a schematic diagram of an exemplary mobile network protected from attack according to a second embodiment.

FIG. 5 illustrates a schematic diagram of an exemplary mobile network protected from attack, according to a second embodiment. An intercept node 520 is implemented on a link from the GRX/IPX 440 into a GGSN 110 of the attacked network. The intercept node 520 replicates the GTP traffic to/from the GGSN 110 and sends the replicated traffic to a monitoring node 560. The monitoring node 560 examines GTP tunnel requests to identify fraudulent GTP requests. In one embodiment, the analysis function 561 examines the GTP tunnel requests, inspects IMSI parameters contained in GTP-C messages, and identifies a fraudulent GTP tunnel that does not belong to the attacked network. The analysis function 561 then informs the automatic decision function 562 that can then send a Delete Session Request to the GGSN 110. The analysis of GTP tunnels can identify GTP fraud in real-time in parallel with the GGSN 110 normal tunnel handling, such that the GGSN 110 can be notified immediately to tear down an established fraudulent GTP tunnel between the SGSN 105 and the GGSN 110. In one embodiment, the monitoring node 560 detects a fraudulent GTP tunnel in parallel with the GGSN 110 normal tunnel handling. The monitoring node 560 monitors a duplicate GTP stream, detects a fraud, and informs the GGSN of the fraud. If the GGSN 110 is notified to reject the request while in a process of setting up the GTP tunnel, the GGSN 110 may simply reject the Create Session Request from the SGSN 105. If the GGSN 110 receives the notification to reject the request too late, the GGSN 110 uses a Delete Session Request to tear down the established GTP tunnel. In another embodiment, the analysis function 561 alerts an OSS/BSS of the fraudulent GTP tunnel. Operations personnel staffing the OSS/BSS may then manually instruct the GGSN 110 to tear down the GTP tunnel via the OSS/BSS manual decision function 563. In yet another embodiment, the automated functions may reside within the GGSN 110 to detect a fraudulent GTP tunnel when that is created.

Figure 6:
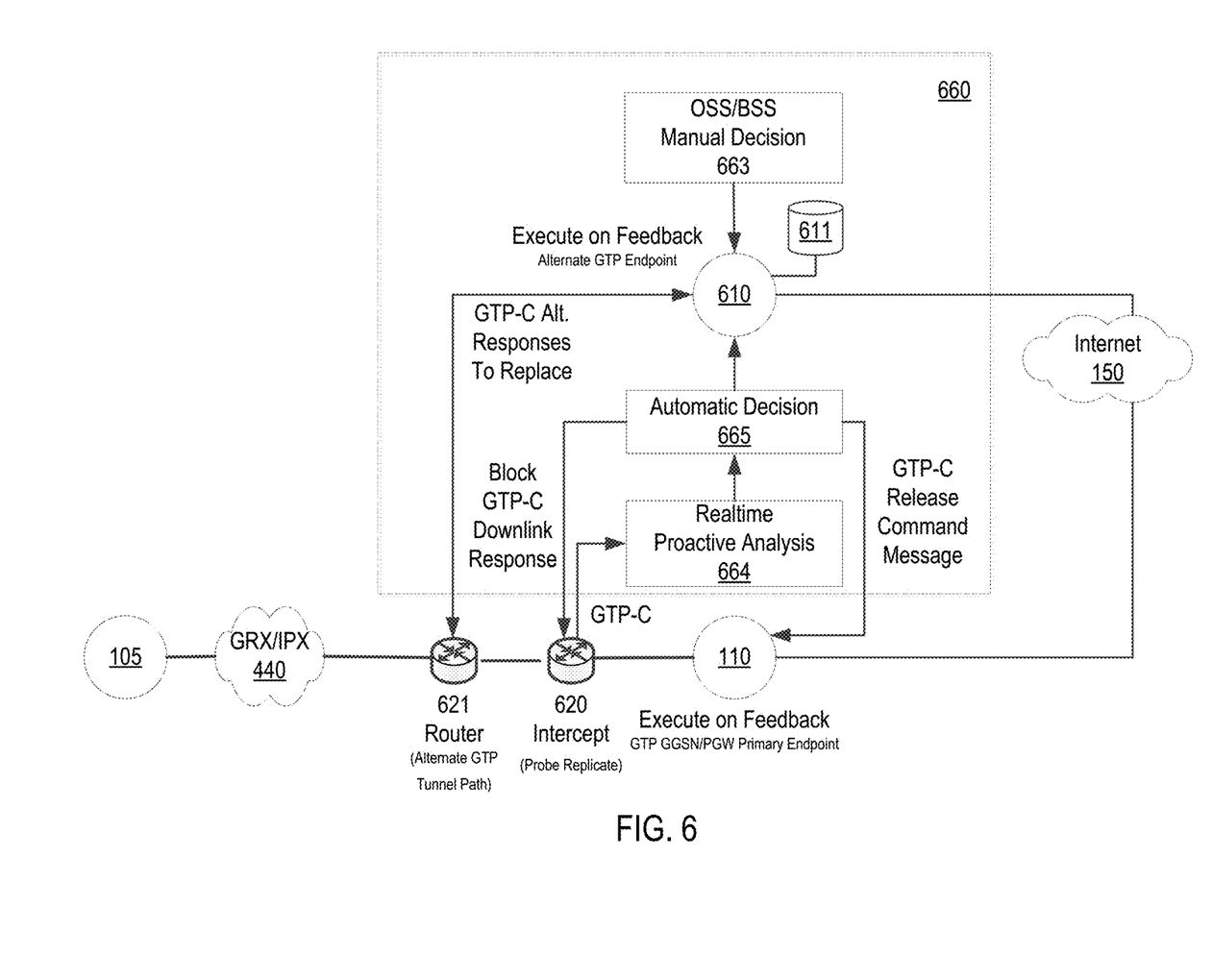
FIG. 6 illustrates a schematic diagram of an exemplary mobile network protected from attack according to a third embodiment.

FIG. 6 illustrates a schematic diagram of an exemplary mobile network protected from attack, according to a third embodiment. Similar to the example with reference to FIG. 5, an intercept node 620 is implemented on a link from the GRX/IPX 440 into a GGSN 110 of the attacked network. Intercept node 620 replicates the GTP traffic to/from the GGSN 110 and sends that traffic to a monitoring node 660. The monitoring node 660 intercepts and inspects GTP-C messages for a Create Session Request in real-time. When the analysis function 664 detects a fraudulent GTP request, the analysis function 664 informs the automatic decision function 665. The automatic decision function 665 may then inform the intercept node 620 to block any further responses by the GGSN 110 to the SGSN 105. The automatic decision function 665 may also then inform the GGSN 110 to reject the Create Session request, removing the GGSN 110 from further involvement. The automatic decision function 665 may then inform an alternate GGSN 610 to respond and setup the GTP tunnel with the SGSN 105. The alternate GGSN 610 then responds through the router 621 and the GRX/IPX 440 to SGSN 105 to setup the GTP tunnel. Once the GTP tunnel is established, GGSN 610 may store all desired GTP-C and GTP-U traffic in data store 611 for forensic analysis. The OSS/BSS 663, which is also alerted of the fraudulent GTP tunnel to GGSN 610, may then monitor traffic and terminate the GTP tunnel manually when desired. In this sense, the monitoring node 660 actively defends the network from fraudulent GTP attacks.

In another embodiment, the intercept node 620 diverts GTP-C traffic to the real-time analysis module 664 of the monitoring node 660 performs real-time analysis on incoming GTP requests. The automatic decision module 665 then decides whether to allow or tear down the GTP tunnel. If allowed, the GTP request is forwarded to the GGSN 110. If not allowed, a reject message is sent toward the SGSN 105. Consequently, the monitoring node 660 is capable of responding in-line with a GTP tunnel request to block the GGSN 110 from receiving a fraudulent GTP request. To this end, the monitoring node 660 can filter out denial-of-service (DoS) attacks exploiting the GTP tunnel security holes. For example, a DoS attack may flood the path between the GGSN 110 with bogus GTP-C Create Session Requests. In another example, other commands such as Update or Delete of GTP tunnel connections may be used as a DoS attack. Other non-GTP or traffic suitable to S5/S8 interface may also be compromised by a DoS attack.

According to one embodiment, the intercept node 620 listens for a response to an Initiate PDP Request or a Create Session Request, and the monitoring node 660 sends an Update PDP Session Request to the SGSN 105. The Update PDP Session Request updates the GGSN address for user traffic, and the SGSN 105 begins to route GTP-U plane traffic to the pseudo GGSN 610. An operator may command the pseudo GGSN 610 to tear down the connection by issuing a tear down request toward the SGSN 105 to disconnect the SGSN 105 and the pseudo GGSN 610.

In the above embodiments, a pseudo GGSN 610 is implemented in addition to the GGSN 110. The pseudo GGSN 610 records evidence of fraudulent activities in the network and stores the data associated with the fraudulent activities in a database 611. Examples of stored data associated with the fraudulent activities include, but are not limited to, a timestamp of a GTP attack, GTP-C control messages to and from the attacking UE, and GTP-U traffic of the attacking UE, and application control signals from the attacking UE.

Figure 7:
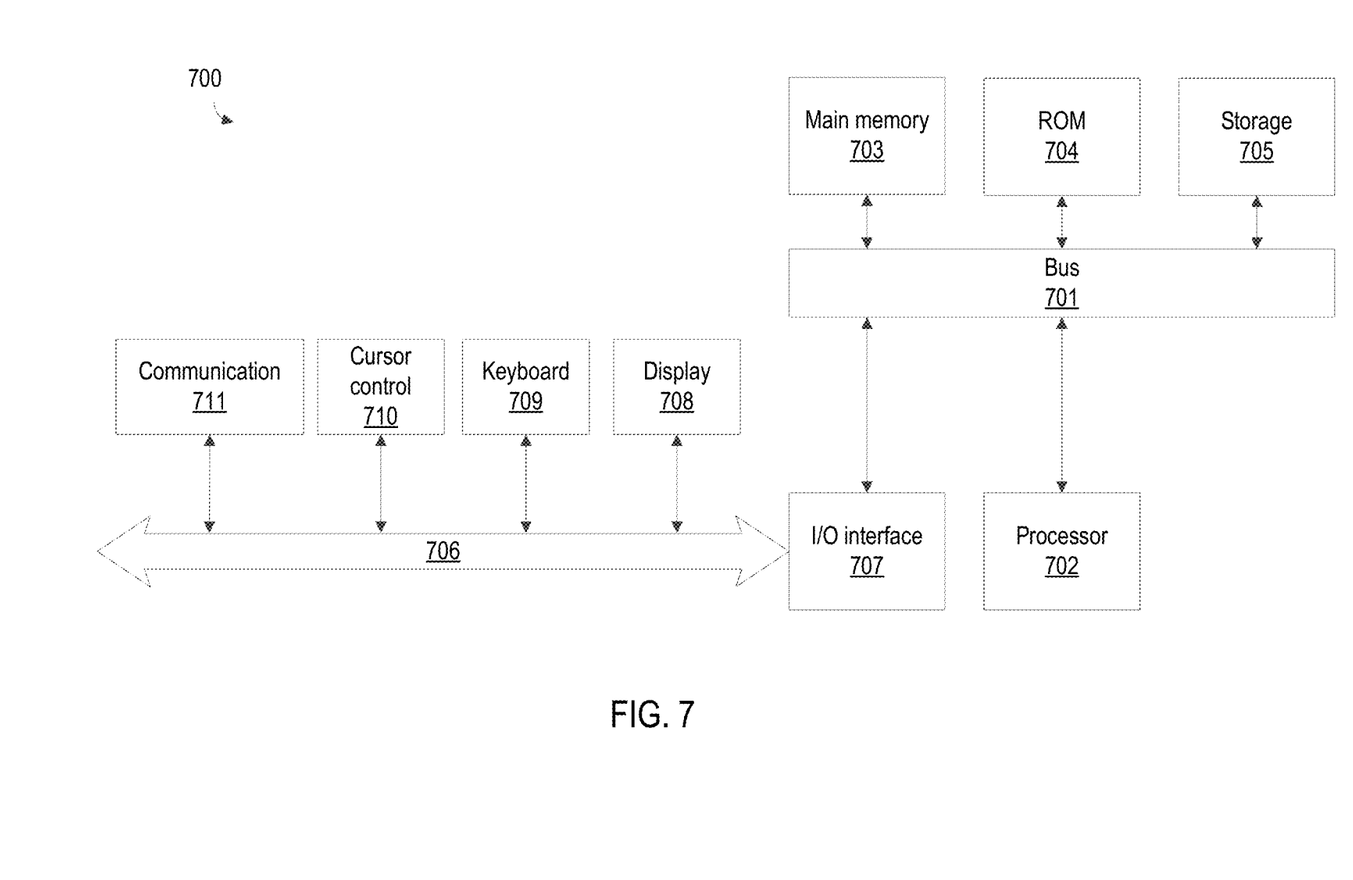
FIG. 7 illustrates an exemplary computer architecture that may be used for the present system, according to one embodiment.

FIG. 7 illustrates an exemplary computer architecture that may be used for the present system, according to one embodiment. The exemplary computer architecture may be used for implementing one or more components described in the present disclosure including, but not limited to, the present content curation system. One embodiment of architecture 700 includes a system bus 701 for communicating information, and a processor 702 coupled to bus 701 for processing information. Architecture 700 further includes a random access memory (RAM) or other dynamic storage device 703 (referred to herein as main memory), coupled to bus 701 for storing information and instructions to be executed by processor 702. Main memory 703 also may be used for storing temporary variables or other intermediate information during execution of instructions by processor 702. Architecture 700 may also include a read only memory (ROM) and/or other static storage device 704 coupled to bus 701 for storing static information and instructions used by processor 702.

A data storage device 705 such as a magnetic disk or optical disc and its corresponding drive may also be coupled to architecture 700 for storing information and instructions. Architecture 700 can also be coupled to a second I/O bus 706 via an I/O interface 707. A plurality of I/O devices may be coupled to I/O bus 706, including a display device 708, an input device (e.g., an alphanumeric input device 709 and/or a cursor control device 610).

The communication device 711 allows for access to other computers (e.g., servers or clients) via a network. The communication device 711 may include one or more modems, network interface cards, wireless network interfaces or other interface devices, such as those used for coupling to Ethernet, token ring, or other types of networks.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

What is claimed is:

1. A method comprising:
    receiving information associated with a general packet radio service (GPRS) tunneling protocol (GTP) request from a serving node to a gateway node in a mobile network, wherein the information associated with the GTP request is a GTP control plane request or a call detail record (CDR) associated with the GTP request;
    intercepting network traffic between the serving node and the gateway node by an intercept node;
    redirecting the network traffic from the intercept node to a monitoring node;
    analyzing parameters contained in the information associated with the GTP request at the monitoring node; and
    determining that the GTP request is a fraudulent GTP request if the parameters do not belong to an authorized subscriber of the mobile network.

2. The method of claim 1, further comprising denying establishing a GTP tunnel associated with the fraudulent GTP request.

3. The method of claim 1,
    wherein the monitoring node is between the serving node and the gateway node.

4. The method of claim 1, wherein
redirecting network traffic from the intercept node to the monitoring node is through a GTP tunnel established between the serving node and the gateway node to the monitoring node.

5. The method of claim 1, wherein the monitoring node is an out-of-band node of the mobile network.

6. The method of claim 1, wherein the monitoring node deletes a GTP tunnel established by the fraudulent GTP request.

7. The method of claim 1, further comprising generating a GTP message to delete a GTP tunnel established by the fraudulent GTP request and sending the GTP message to either the serving node or the gateway node.

8. The method of claim 1, further comprising performing a real-time analysis on the GTP request.

9. The method of claim 1, further comprising filtering denial-of-service (DoS) attacks including the fraudulent GTP request or a fraudulent GTP message.

10. The method of claim 1, further comprising:
implementing a pseudo gateway node;
creating a packet data protocol (PDP) session;
routing user data traffic to the pseudo gateway node over the Internet; and
saving the user data traffic to a database of the pseudo gateway node over the Internet.

11. The method of claim 1, further comprising receiving a demand from an operator of the mobile network and deleting the PDP session based on the demand.

12. The method of claim 1, wherein the mobile network is a 3G network, wherein the serving node is a serving general packet radio service (GPRS) support node (SGSN), and wherein the gateway node is a gateway GPRS support node (GGSN).

13. The method of claim 12, wherein authentication and subscription information of a subscriber is maintained by a home location register (HLR).

14. The method of claim 1, wherein the mobile network is a 4G network, wherein the serving node is a serving gateway (S-GW), and wherein the gateway node is a packet data network gateway (P-GW).

15. The method of claim 14, wherein authentication and subscription information of a subscriber is maintained by a home subscriber server (HSS).

16. A mobile network system comprising:
a serving node configured to serve a subscriber of the mobile network system;
a gateway node configured to establish an external packet switched network;
a monitoring node; and
an intercept node configured to replicate traffic between the serving node and the gateway node and send the replicated traffic to the monitoring node,
wherein the monitoring node examines information associated with a GTP request from the replicated traffic, analyzes parameters contained in the information, and determines that the GTP request is a fraudulent request.

17. The mobile network system of claim 16, wherein the information associated with the GTP request is a GTP control plane request or a CDR.

18. The mobile network system of claim 16, wherein the monitoring node deletes a GTP tunnel established by the fraudulent GTP request.

19. The mobile network system of claim 16, wherein the monitoring node generates a GTP message to delete a GTP tunnel established by the fraudulent GTP request and sends the GTP message to either the serving node or the gateway node.

20. The mobile network system of claim 19, further comprises:
a probe implemented between the serving node and the gateway node; and
a pseudo gateway node,
wherein the pseudo gateway node is configured to:
receive user data traffic routed to the pseudo gateway node, wherein the user data traffic is routed to the pseudo gateway node in response to a PDP session request by the probe; and
save the user data traffic to a database over the Internet.

\* \* \* \* \*